United States Patent
Maryniok

(10) Patent No.: US 10,385,831 B2
(45) Date of Patent: Aug. 20, 2019

(54) GUIDING DEVICE FOR STRAND-SHAPED COMPONENTS, SUCH AS ENERGY- AND/OR INFORMATION-CONDUCTING CABLES OF WIND TURBINES

(71) Applicant: HYDAC INTERNATIONAL GMBH, Sulzbach/Saar (DE)

(72) Inventor: Peter Maryniok, Mettlach (DE)

(73) Assignee: HYDAC INTERNATIONAL GMBH, Sulzbach/Saar (DE)

( * ) Notice: Subject to any disclaimer, the term of this patent is extended or adjusted under 35 U.S.C. 154(b) by 0 days.

(21) Appl. No.: 15/775,099

(22) PCT Filed: Oct. 7, 2016

(86) PCT No.: PCT/EP2016/001670
§ 371 (c)(1),
(2) Date: May 10, 2018

(87) PCT Pub. No.: WO2017/080628
PCT Pub. Date: May 18, 2017

(65) Prior Publication Data
US 2018/0320668 A1 Nov. 8, 2018

(30) Foreign Application Priority Data

Nov. 11, 2015 (DE) ........................ 10 2015 014 563

(51) Int. Cl.
*H02G 3/30* (2006.01)
*F03D 80/80* (2016.01)
*F03D 9/25* (2016.01)

(52) U.S. Cl.
CPC ............. *F03D 80/85* (2016.05); *F03D 9/255* (2017.02); *H02G 3/30* (2013.01); *Y02E 10/72* (2013.01)

(58) Field of Classification Search
CPC ............ H02G 3/30; H02G 3/305; H02G 3/32; H02G 3/36; H02G 3/88; F03D 80/85; F03D 9/255; F03D 9/20; Y02E 10/72
(Continued)

(56) References Cited

U.S. PATENT DOCUMENTS 7,982,330 B1 * 7/2011 Ueno ....................... F03D 13/20
290/55
8,227,695 B2 * 7/2012 Ueno ..................... H02G 11/00
174/68.1
(Continued)

FOREIGN PATENT DOCUMENTS

CN 202034719 11/2011
DE 10 2010 008 639 8/2011
(Continued)

OTHER PUBLICATIONS

International Search Report (ISR) dated Feb. 2, 2018 in International (PCT) Application No. PCT/EP2016/001670.

*Primary Examiner* — Angel R Estrada
(74) *Attorney, Agent, or Firm* — Wenderoth, Lind & Ponack, L.L.P.

(57) ABSTRACT

A guiding device for strand-shaped components, such as energy- and/or information-conducting cables (5) of wind turbines (1, 3), has a guiding part (7) for partially holding the components. The guiding part (7) can be fastened to a tower segment (3) of the turbine (1, 3) by a fastening apparatus (13, 15). The fastening apparatus performs the fastening of the associated guiding part (7) by an adhesion apparatus (13), preferably in a detachable manner.

13 Claims, 4 Drawing Sheets

(58) Field of Classification Search
USPC ........ 174/135, 68.1, 68.3, 72 A; 290/55, 44, 290/54; 248/68.1, 49
See application file for complete search history.

(56) References Cited

U.S. PATENT DOCUMENTS

| | | | | |
|---|---|---|---|---|
| 8,664,544 | B2 * | 3/2014 | Even | ................ F03D 80/85 174/144 |
| 8,669,474 | B2 * | 3/2014 | Battle | ................ H01B 9/027 174/113 R |
| 8,866,330 | B2 * | 10/2014 | Domesle | ................ F03D 13/20 174/100 |
| 2004/0244326 | A1 | 12/2004 | Ollgaard | |
| 2007/0246613 | A1 | 10/2007 | Kennedy | |
| 2009/0206610 | A1 * | 8/2009 | Martin | ................ F03D 80/82 174/136 |

FOREIGN PATENT DOCUMENTS

| | | |
|---|---|---|
| DE | 10 2010 032 687 | 2/2012 |
| EP | 2 762 723 | 8/2014 |
| WO | 2004/099609 | 11/2004 |
| WO | 2010/108538 | 9/2010 |
| WO | 2014/053230 | 4/2014 |

* cited by examiner

GUIDING DEVICE FOR STRAND-SHAPED COMPONENTS, SUCH AS ENERGY- AND/OR INFORMATION-CONDUCTING CABLES OF WIND TURBINES

FIELD OF THE INVENTION

The invention relates to a guiding device for strand-shaped components, such as energy- and/or information-conducting cables of wind turbines, having least one guiding part for partially holding the components. The one guiding part can be fastened to a tower segment of the system by a fastening device.

BACKGROUND OF THE INVENTION

In order to carry off the energy generated in wind turbines and for other operational purposes, such as control, monitoring and the like, cables extending from the machine housing downwards through the tower must be guided in such a way that, during operational movements of the cables, which as a cable bundle hang downwards in the tower from the machine housing, no damage or impairment of the cables occurs. In the case of conventional wind turbines, the machine housing with the generator unit, from which the cable bundle hangs downwards starting in the tower, can realize several rotations before the machine house is controlled back. The cable bundle must be guided in such a way that the cables in the cable bundle hanging in the tower can in fact also realize the movement, without formation of a disorganized ball, in which the cables rub against one another in such a way that damage to the insulation can be anticipated.

For this reason in the state of the art, cf. WO 2010/108538 A1, the cables hanging down from the machine housing are guided through a series of consecutive guiding parts. The guiding parts are distance pieces or spacers, and guide the cables distanced or spaced from one another, with the bottom-most guiding part, also called fixing stars or bottom spacers, being fastened in a non-rotatable manner on a corresponding tower segment.

The fixation of the bottom-most guiding part to be fastened on the corresponding tower segment is difficult to realize in the case of already installed systems. A welded joint as the fastening device is highly undesirable and not admissible for safety reasons because of the risk of corrosion. In the long run, the welded joint leads to damage to the structural strength of the tower segment. This problem is also true of a fastening by machining encroachment in the tower material.

SUMMARY OF THE INVENTION

In light of these problems, the problem addressed by the solution of the invention is to provide a guiding device with a fastening device permitting a reliable connection of the guiding part to be fastened without compromising the tower structure.

According to the invention, in order to solve this problem in a guiding device of the type described above, the fastening device realizes the fastening of the corresponding guiding part, preferably in a redetachable manner, by an adhesion device. When using a fastening device that functions without encroachment into the material structure of the tower segment, which works by adhesive force formed, for example, by devices generating magnetic force, it is possible to realize a fastening without damaging the tower structure.

In a particularly advantageous manner, the adhesion device is designed to be redetachable to permit the removal of the guiding part from its operational position. Maintenance work or expansion of the system can then be realized in a simple and convenient manner when the fastening device is detached. In certain cases, it is also conceivable to use as the fastening device that functions by adhesive force generated by a pneumatic vacuum device with suction bodies.

Particularly advantageously, the adhesive device has at least one magnetic field-generating fastening component, such as a permanent magnet. The permanent magnet cooperates with a magnet-attracting material, such as a steel material, of the assignable tower segment of the system. When permanent magnets are used, the fastening device functions independently, without requiring an activation or an energy supply from the outside. In particular, when the steel material of the tower segment has a color protection layer for corrosion protection reasons, the magnetic field-generating fastening component, preferably in the form of a permanent magnet, can be applied and also removed again if necessary, without damaging the protective layer. No equivalent of this structure is in the prior art.

The adhesive device can advantageously have at least one compensator, which permits axial and/or radial compensatory movements of the guiding part in a definable range. This compensator ensures a particularly protective guiding of the cable bundle. Any swinging of the cable bundle is absorbed.

In particularly advantageous exemplary embodiments the adhesive device has individual segments extending with an arc-shaped curve. The respective curvature of the segments follows the curvature of the inner wall of the assignable tower segment of the system. This arrangement produces a particularly strong adhesive force.

Particularly advantageously, each individual segment has a plurality of individual permanent magnets that, by a common handle, can be mounted on the tower segment and removed again therefrom. The assembly and disassembly of the guiding device can then be easily realized.

In an advantageous manner, the compensator can have a plurality of tension springs, which are linked with their one free end to the handle of the permanent magnet of an individual segment and with their other free end to a common linking bolster. The linking bolster transfers the common traction force to a linking cord, on which the one assignable guiding part is arranged. The use of a linking cord to transfer the retention force permits a light-weight construction of the guiding device.

Three individual segments arranged relative to one another at a distance measured in the circumferential direction of the tower segment can particularly advantageously support the guiding part in its operational state in the tower segment of the system.

In particularly advantageous exemplary embodiments of the guiding device, in addition to the one guiding part that can be fastened by the fastening device, the additional guiding parts are arranged between this guiding part and a pivotable nacelle of the wind turbine. The additional guiding parts are formed in the manner of cable clamp bodies. These cable clamp bodies can be formed in a manner known per se, as is depicted for example in FIGS. 1 to 6 in the document DE 10 2010 032 687 A1. The particular advantage of this structure is that this retention device can be retrofitted in installed systems.

In a manner that is also known per se, cf. WO 2010/108538, on the side facing away from the nacelle below the one guiding part with the redetachable fastening device, a loop guide can be arranged in a stationary manner in the tower of the wind turbine for the purpose of cable feeding.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
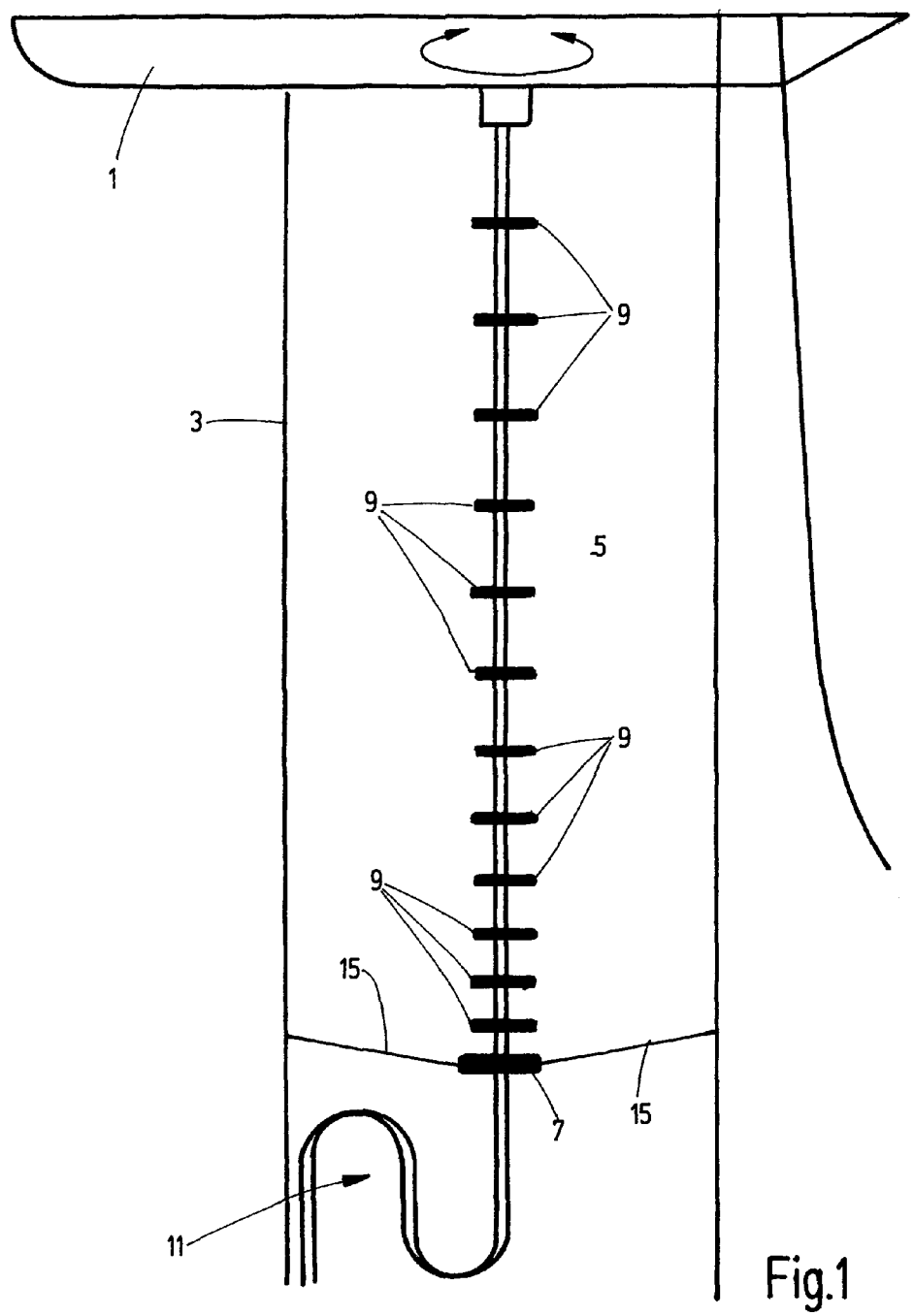
FIG. 1 is a highly schematically simplified, sketch-like depiction, of an inner side of tower segments adjoining the nacelle (machine housing) of a wind turbine, with an exemplary embodiment of the guiding device according to the invention.

Of a wind turbine FIG. 1 shows the region adjoining the nacelle 1 (machine house or housing) of the top tower segment 3 with a cable bundle 5 located on the inside and hanging down from the nacelle 1. The cable bundle 5 is, in the extension from the nacelle 1 up to a bottom-most guiding part 7, a fixing star or bottom spacer. Guiding part 7 is fastened in a non-rotatable manner by a fastening device on an assigned tower segment 3. Cable bundle 5 is guided through a succession of freely rotatable guiding parts 9. These guiding parts 9, just like the fastened guiding part 7, as distance pieces guide, in a manner known per se, the cable bundle 5 in such a way that the individual cables are arranged distanced from one another. For the length compensation, which is required in the case of twisting of the bundle 5 in the rotational movements of the nacelle 1 because the non-rotated bundle 5 is shortened in the case of rotation, the individual cables in the fastened bottom-most guiding part 7 are guided in an axially mobile manner. For this purpose, this guiding part 7 can be designed as is disclosed for such guiding parts in document WO 2014/053230 A1 for example in FIGS. 7 to 10. Below this guiding part 7 for the required length compensation there is a loop guide 11 arranged stationary in the tower in such systems for the purpose of cable feeding, the details of which are not depicted in FIG. 1.

Figure 2:
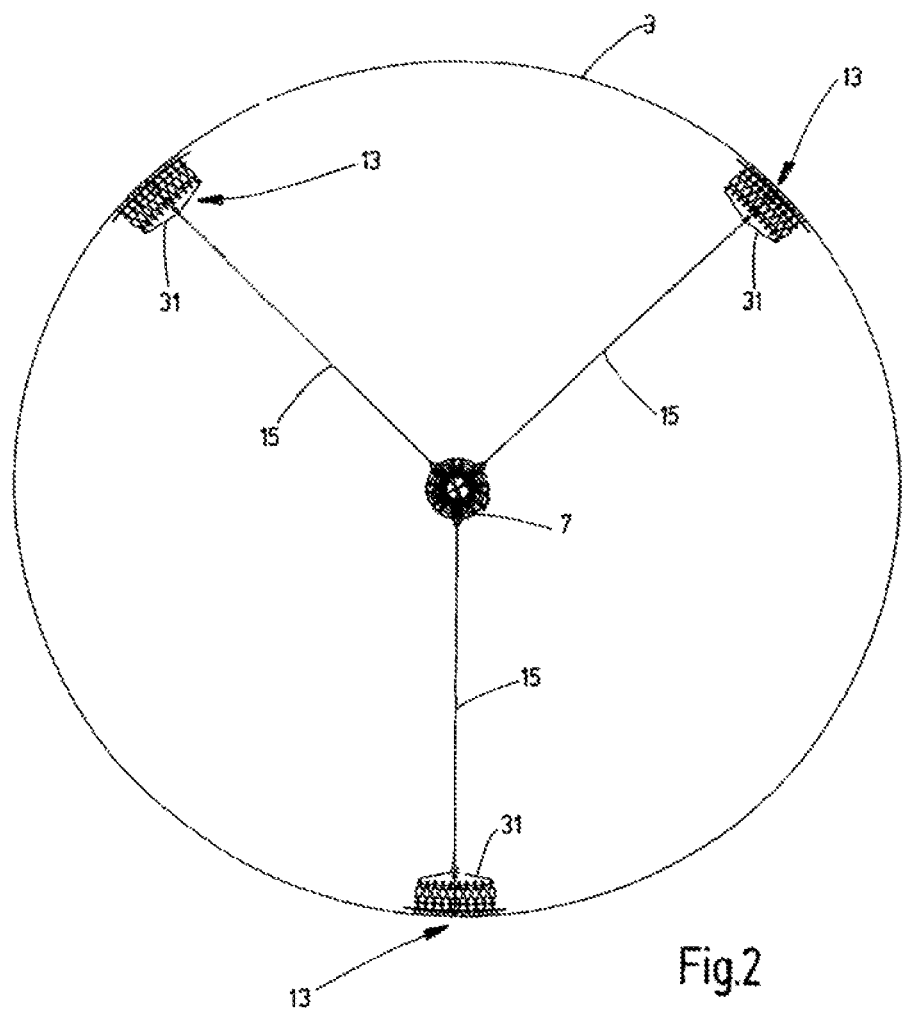
FIG. 2 is a top view of the guiding part fastened to a tower segment of the exemplary embodiment of the guiding device according to the invention.

Further details of the fastening device provided in the guiding device according to the invention for anchoring the bottom-most guiding part 7 on the corresponding tower segment 3 are depicted in FIGS. 2 to 5. As FIG. 2 shows, the fastening device has three individual segments 13 that adhere to the inner wall of the tower segment 3 at a distance from one another measured in the circumferential direction of the tower segment 3. Each individual segment 13 is connected to the guiding part 7 by a pull cord 15. While FIG. 2 shows an example of the arrangement of the individual segments 13, in which two of the individual segments 13 are arranged relative to one another at an angular distance of 90° and the other individual segment 13 has a greater angular distance relative to them, all individual segments 13 can be arranged at the same angular distance of 120° relative to one another.

Figure 3:
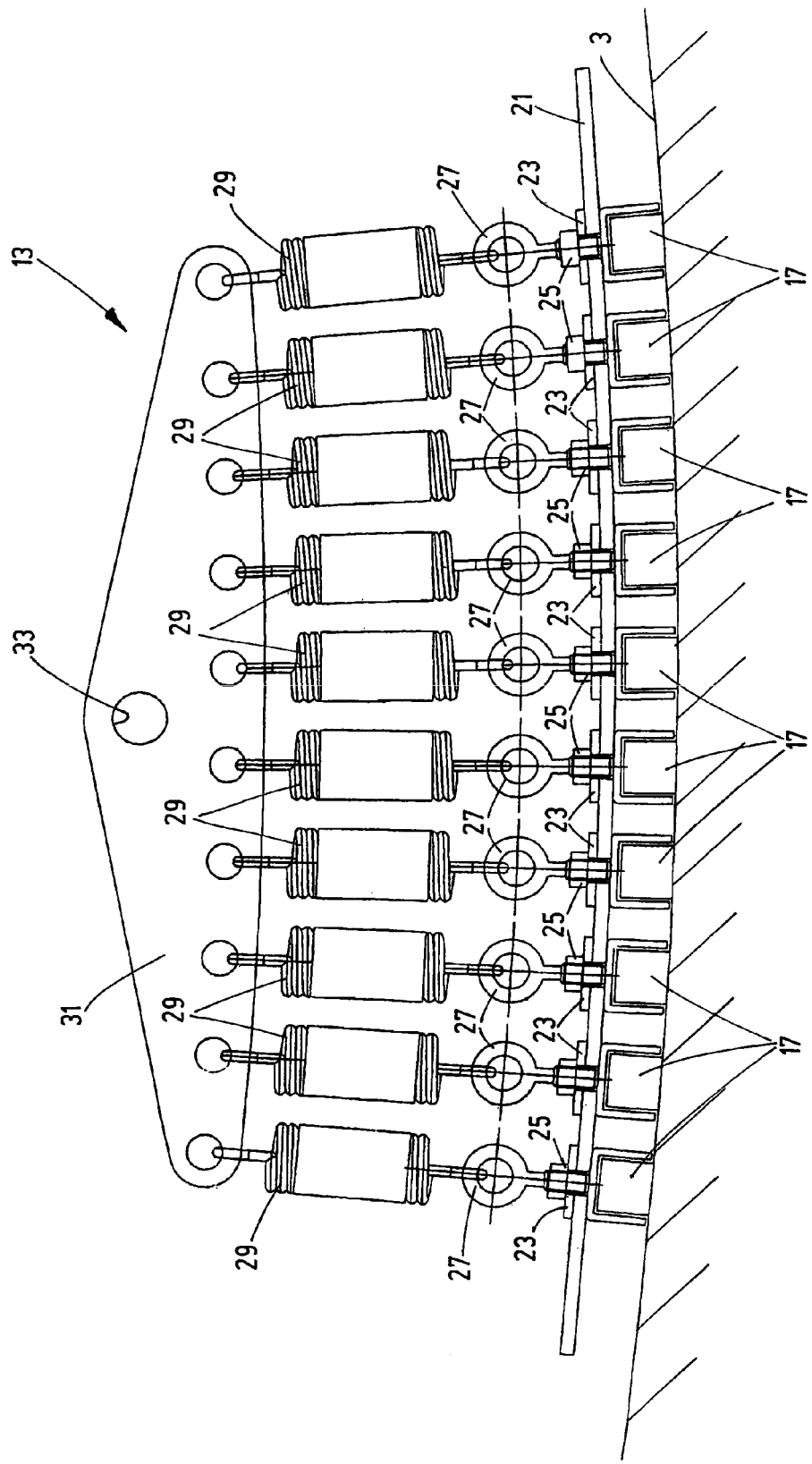
FIG. 3 is a top view, depicted approximately in life size of a practical embodiment, of an individual segment of the fastening device of the exemplary embodiments of the guiding device according to the invention.

FIG. 3 shows one of the individual segments 13 in a separate depiction. As FIG. 3 shows, each segment 13 has ten permanent magnets 17 located at a small distance from one another and welded in succession with their magnet housing 19 (FIGS. 4 and 5) with a metal band 21. With the band 21, the series of magnets 17 follows the curvature of the inner wall of the tower segment 3. Aligned with each magnet 17, a retention plate 23 is mounted on the band 21 by screws 25. In the central regions of the retention plates 23, retention eyelets 27 are welded thereto. One end of a tension spring 29 is hung in each of the retention eyelets 27. The other ends of the tension springs 29 are linked to a linking bolster 31. Each linking bolster has the form of a metal plate in the shape of a small triangle, which extends over the entire series of the tension springs 29. In the central region, the linking bolster 31 forms the linking point 33 for the connection with the corresponding pull cord 15. In this arrangement, the tension springs 29 form, in cooperation with the linking bolsters 31, a compensator device, which transfers the retention force acting between the pull cord 15 and the inner wall of the tower segment 3 evenly to each permanent magnet 17. The band 21 projects laterally on both sides of the series of magnets 17, and thus, forms a handle which can be grasped to release the segment 13 from the adhering position for a disassembly, in that the magnets 17 are sequentially tipped out of the normal position, in which they lie with strong adhesive force on the tower segment 3.

Figures 4, 5:
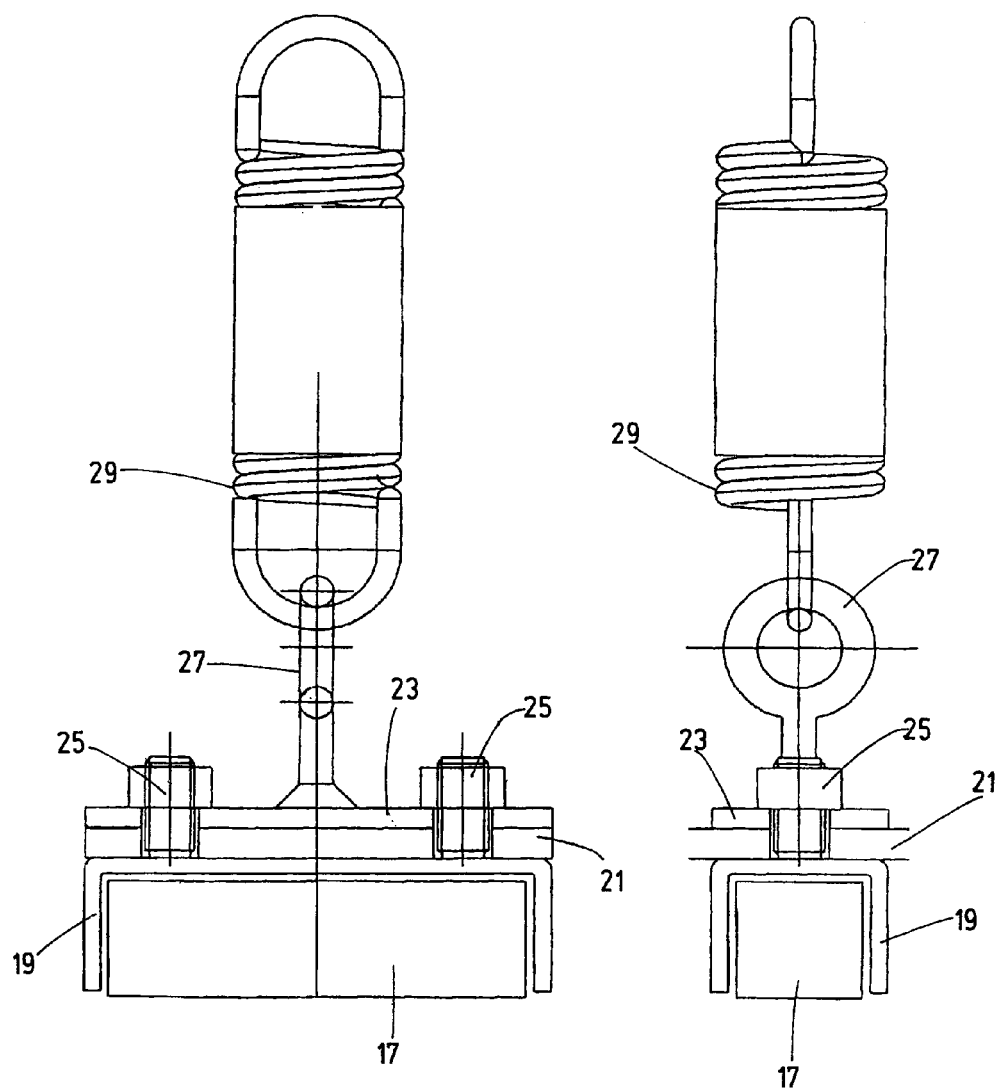
FIGS. 4 and 5 are side views depicting enlarged views relative to FIG. 3, or face view of an individual permanent magnet of the individual segment of FIG. 3 with corresponding supports.

As the comparison of FIGS. 4 and 5 shows, the magnets 17 have a rectangular block form, in which the long side visible in FIG. 4 has more than double the length of the width of the face side, which is visible in FIGS. 3 and 5. On the band 21, the magnets 17 are arranged at a distance, which is somewhat shorter than the width of the face side. With the flexibility of the compensator device of the individual segments 13 provided by the tension springs 29, the fastening device permits slight axial and/or radial compensatory movements for the bottom-most guiding part 7, although it is held substantially non-rotatable, by which movements any transverse forces which may arise in a fitful manner during operation between the bundle 5 and the guiding part 7 are mitigated, so that a particularly protective cable guiding is ensured.

While one embodiment has been chosen to illustrate the invention, it will be understood by those skilled in the art that various changes and modifications can be made therein without departing from the scope of the invention as defined in the claims.

The invention claimed is:

1. A guiding device for strand-shaped components, the guiding device comprising:
   a guiding part capable of partially holding stand-shaped components;
   a fastening device coupled to said guiding part and configured to couple detachably said guiding part to a wind turbine tower segment with an adhesion device, said adhesion device including a plurality of individual segments extending along arc-shaped curves following a curvature of an inner wall of the tower segment;
   a series of individual permanent magnets on each of said individual segments; and a band having free ends on a side of said permanent magnets closest of said guiding part projecting laterally from both sides of each of said series of plural permanent magnets forming a common handle capable of being grasped for connecting said permanent magnets the respective individual segment with the tower segment and capable of being grasped to release the respective individual segment from adhering to the tower segment by sequentially tipping the relative permanent magnets out of normal adhering positions adhesively coupled to the tower segment.

2. A guiding device according to claim 1 wherein said guiding part is capable of being repeatedly attached and detached from an operation position thereof on the tower segment.

3. A guiding device according to claim 1 wherein said adhesion device comprises a compensator permitting axial and radial compensatory movements of said guiding part in a definable range.

4. A guiding device according to claim 3 wherein said compensator comprises a plurality of tension springs, each of said tension springs having a first free end linked to the respective common handle and a second free end linked to a common linking booster connected to the respective common handle by the respective tension spring; and linking cords connect each said linking booster to said guiding part and transfer forces between each said common linking booster and said guiding part.

5. A guiding device according to claim 1 wherein said adhesion device comprises three of said individual segments spaced from one another at distances in a circumferential direction of the tower segment supporting said guiding part in an operational state in the tower segment.

6. A guiding device according to claim 1 wherein a stationary guide loop is located on a side of said guiding part remote from a nacelle of the tower segment for cable feeding.

7. A wind turbine support, comprising:
a tower with a pivotable nacelle at a top end of said tower and with an inner wall that is tubular and curved in a plane transverse to a longitudinal axis of said tower;
a guiding part holding a part of strand-shaped component extending from a nacelle and inside said tower at a location spaced along said longitudinal axis from said nacelle;
a plurality of individual segments being coupled to said guiding part by connections and extending along curves following a curvature of said inner wall;
a series of individual permanent magnets on each of said individual segments and magnetically adhered to a tower segment of said inner wall of said tower; and
a band having free ends being spaced from said inner wall and projecting laterally from both sides of each of said series of permanent magnets on each of said individual segments, each said band forming a common handle capable of being grasped for connecting said permanent magnets of the respective individual segment to said inner wall and capable of being grasped to release the respective individual segment from adhering to said inner wall by sequentially tipping the respective permanent magnets out of a normal adhering position adhesively coupled to said inner wall.

8. A wind turbine support according to claim 7 wherein said guiding part is capable of being repeatedly attached and detached from an operation position thereof on the tower segment.

9. A wind turbine support according to claim 7 wherein said connections comprise compensators permitting axial and radial compensatory movements of said guiding part in a definable range.

10. A wind turbine support according to claim 9 wherein each of said compensators comprises a plurality of tension springs with each of said tension springs having a first free end linked to the respective common handle and a second free end linked to a common linking booster connected to the respective common handle by the respective tension springs; and linking cords connect each said linking booster to said guiding part and transfer forces between each said common linking booster and said guiding part.

11. A wind turbine support according to claim 7 wherein three of said individual segments are spaced from one another at distances in a circumferential direction of said inner wall and support said guiding part in an operational state inside said tower.

12. A wind turbine support according to claim 7 wherein a stationary loop is located on a side of said guiding part remote from said nacelle for cable feeding.

13. A wind turbine support according to claim 7 wherein between said nacelle and said guiding part, additional guiding parts are located on said strand-shaped component.

* * * * *